Figure 2:
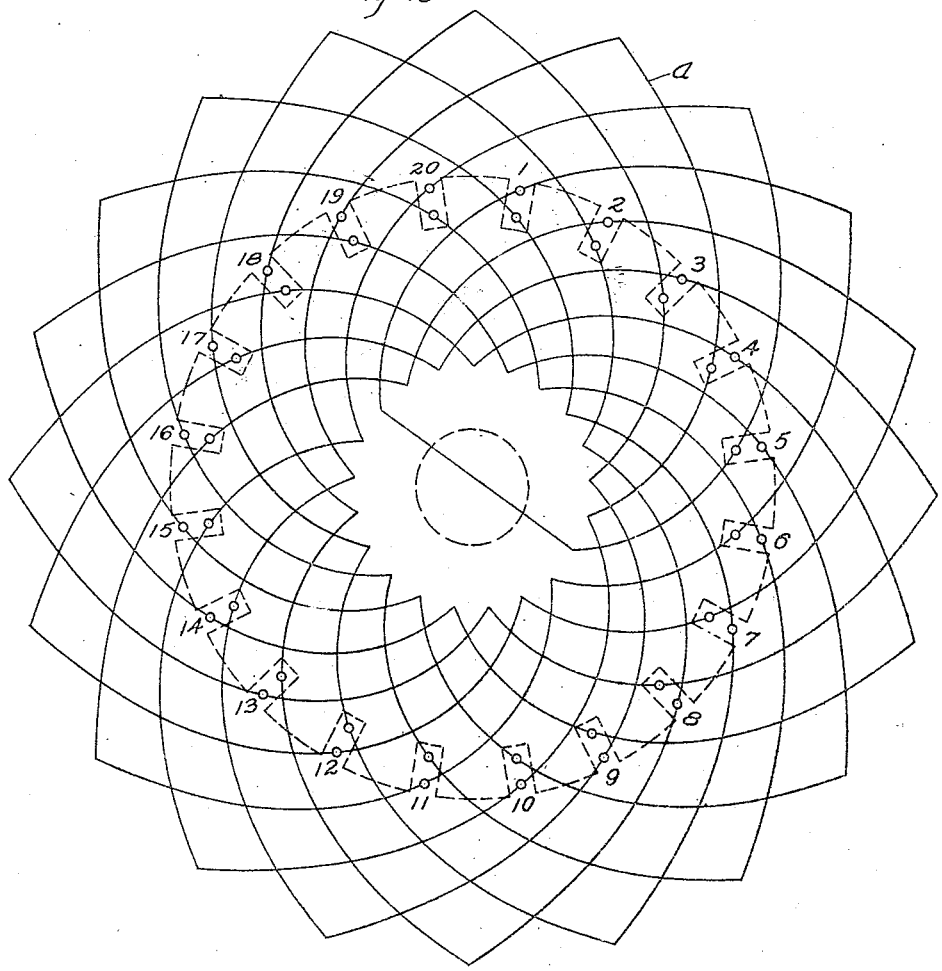

E. F. W. ALEXANDERSON.
ALTERNATING CURRENT MOTOR.
APPLICATION FILED MAY 19, 1906.
920,896.
Patented May 4, 1909.
2 SHEETS—SHEET 1.
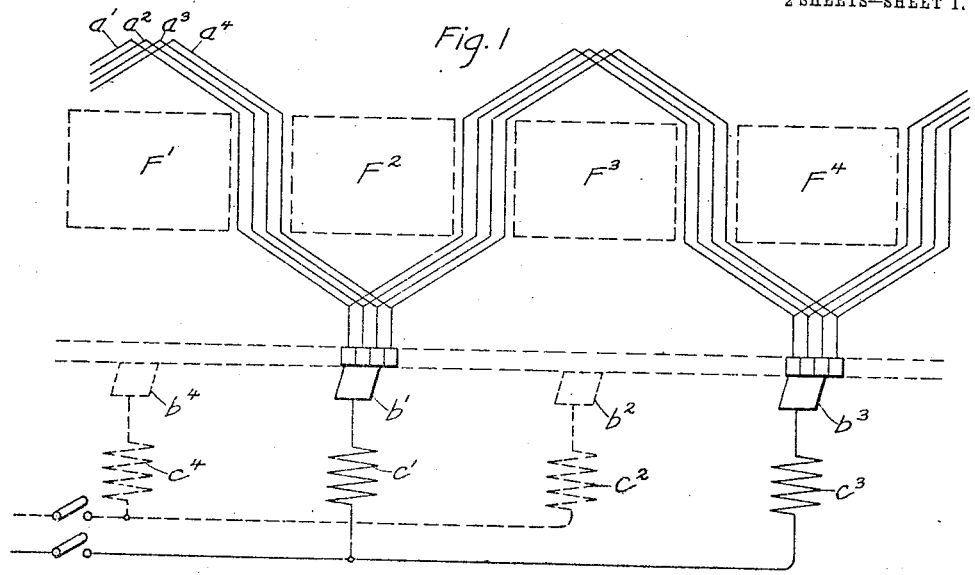
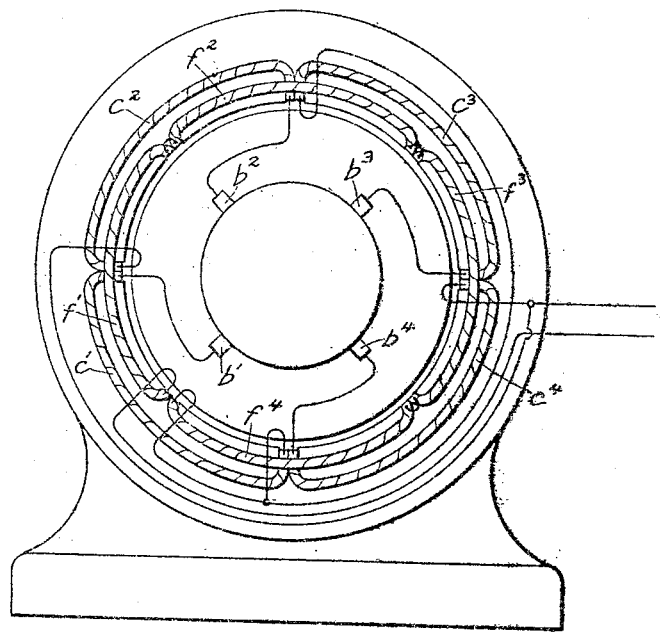
Witnesses:
Inventor;
Ernst F. W. Alexanderson
By Albert G. Davis
Att'y

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ALTERNATING-CURRENT MOTOR.

No. 920,896.    Specification of Letters Patent.    Patented May 4, 1909.

Application filed May 19, 1906. Serial No. 317,764.

*To all whom it may concern:*

Be it known that I, ERNST F. W. ALEXANDERSON, a subject of the King of Sweden, residing at Schenectady, county of Schenectady, State of New York, have invented certain new and useful Improvements in Alternating-Current Motors, of which the following is a specification.

My invention relates to alternating-current motors of the commutator type, and its object is to provide a novel winding and connections for such motors so as to improve their commutation.

My invention, in one aspect, relates specifically to multipolar motors having wave-wound armatures.

It has been proposed heretofore to employ a plurality of armature windings connected to successive commutator segments and to use a brush of a width insufficient to bridge adjacent segments connected to the same winding, for the purpose of avoiding short-circuits during commutation. With such an arrangement each winding is successively open-circuited, as the segments to which it is connected pass from beneath a brush, but short-circuiting of individual coils upon themselves in commutation is avoided by this arrangement. In the case of a wave-wound armature, however, if it is attempted to employ more than one brush or set of brushes of each polarity, internal short-circuits are produced, even with a plurality of windings and narrow brushes. This fact appears from laying out such a winding. It will be seen, for instance with three windings, that starting from one brush on winding 1 and proceeding to a second brush, which connects winding 1—2, passing through that brush to winding 2, thence to another brush and through that brush to winding 3, then to still another brush, a path will be found back to winding 1, so that a complete circuit around the armature is closed directly on itself. This short-circuit, which comprises as many coils as there are poles, is subjected during commutation to the entire alternating field of the motor, and consequently produces excessive heating and sparking. For this reason it has been customary heretofore to use only one brush or set of brushes of each polarity in wave-wound alternating-current motors. It is frequently desirable, however, in order to reduce the size of commutator, to employ a plurality of sets of brushes of each polarity. One feature of my invention consists in a novel arrangement of windings, whereby the use of the desired number of brushes is rendered possible.

My invention, in one aspect, consists in arranging each of the wave-windings of the armature with a pitch exactly equal to unity, so that the number of commutator segments is exactly divisible by the number of poles and windings. Consequently, if a commutator segment is at the point of engaging one brush, other segments connected to the same winding will be at that instant engaging all the other brushes. The same windings are engaged by all the brushes at the same time, and all of one winding is open-circuited when any portion of it is open-circuited. With such an arrangement it will be found impossible to trace an internal short-circuit, as is possible with the usual fractional pitch windings. For instance, if three windings are employed and a brush not wider than two segments is used, if one brush is connecting windings 1 and 2, all the other brushes will similarly be connecting windings 1 and 2, and winding 3 will be completely open-circuited so that no path can be found from winding 2 to winding 3, and thence back through another brush to winding 1.

When a number of brushes of each polarity are employed, it is of course necessary that these brushes should be connected together. If this connection is made directly, a difference in the voltages at the brushes of the same polarity may produce heavy cross-currents. It has been proposed before to insert resistances or other impedances between the brushes of the same polarity, in order to avoid these cross-currents in alternating-current motors. One of the features of my invention consists in employing the usual compensating winding for this purpose by inserting portions of it in the connections between brushes of the same polarity. Each portion of the compensating winding being in inductive relation to a corresponding portion of the armature winding offers practically no impedance to current flowing from an external source to the brushes, but offers a high impedance to a current flowing from one brush through the compensating winding to another brush of the same polarity. In fact, the compensating winding acts like a differential choke-coil, maintaining a practically uniform distribution of the current from the external source between the brushes.

My invention will best be understood by reference to the accompanying drawings, in which—

Figure 1 shows diagrammatically in development a portion of the armature winding and connections of a motor arranged in accordance with my invention; Fig. 2 shows a diagrammatic view of one complete armature winding; and Fig. 3 shows diagrammatically the connections of the motor.

In Fig. 1, $a^1$, $a^2$, $a^3$ and $a^4$ represent four wave-windings which are connected to successive commutator segments. The positions of the magnetic field poles of the motor are indicated in dotted lines by $F^1$, $F^2$, $F^3$ and $F^4$. It will be seen that each winding has a pitch exactly equal to unity,—that is, to the distance between the center lines of the poles. Consequently, if two brushes $b^1$ and $b^3$ are arranged symmetrically with respect to the poles $F^2$ and $F^4$,—or in other words, diametrically opposite each other on the commutator, both brushes will be in symmetrical position with respect to all the windings. It will be seen that the brush-width is somewhat less than three commutator segments, so that each brush in the position shown engages windings $a^1$, $a^2$ and $a^3$, while winding $a^4$ is open-circuited at both brushes.

Since the pitch of each armature winding is unity the number of commutator segments for each winding will be a number divisible by the number of poles, instead of being one or two greater or less than a multiple of the pole number, as in the usual arrangement. Consequently, a winding somewhat different from a standard winding is required for such a motor, and I have indicated in Fig. 2 one suitable arrangement of armature winding. In this figure only one of the armature windings is shown. It will be understood that the other windings will be arranged in precisely the same manner. The armature winding $a$ is shown carried in twenty slots, five per pole. Consequently, the pitch of the winding is five slots. Starting with the upper conductor in slot 1, it will be seen that the winding progresses successively to slots 6, 11 and 16; the pitch in each case being five slots. The lower conductor in slot 16 is connected to the upper conductor in slot 2; this end connection being somewhat longer than the other connections in order to avoid closing the winding directly upon itself after passing once around the armature. From slot 2 the winding progresses to slots 7, 12, 17, 3, 8, etc., until finally the lower conductor in slot 5 is reached. This conductor is simply connected to the upper conductor in slot 1 so as to close the winding upon itself. This winding which I have shown is simply one suitable arrangement, and other forms of winding which permit of using a number of commutator segments divisible by the number of poles may be employed.

It will be seen in Fig. 1 that brushes $b^1$ and $b^3$ are of the same polarity, and consequently should be connected together. Instead of connecting these brushes directly, the connection from brush $b^1$ to the external source is made through a portion $c'$ of the compensating winding of the motor, while the connection from brush $c^3$ is similarly made through a portion $c^3$ of the compensating winding. Brushes $b^2$ and $b^4$ of the opposite polarity are shown in dotted lines in Fig. 1.

The complete connections of a series compensated motor arranged in accordance with my invention are shown in Fig. 3. These connections may be traced as follows: Starting from the lower motor terminal the current passes through the field coils $f^1$, $f^2$, $f^3$ and $f^4$ in series. Coming from coil $f^4$ the current divides, part passing through compensating coil $c^1$ to brush $b^1$, and the remainder passing through compensating coil $c^3$ to brush $b^3$. After passing through the armature winding the current flows through brushes $b^2$ and $b^4$, passing from the former brush through compensating coil $c^2$ to the upper motor terminal, and from the brush $b^4$ through compensating coil $c^4$ to the upper motor terminal.

Compensating coil $c^3$ is in inductive relation to the portion of the armature winding with which brush $b^3$ is in engagement. Consequently practically no impedance is offered to current flowing from the external source through compensating coil $c^3$ to this brush, but any current flowing from brush $b^3$ to brush $b^1$ must flow through the compensating coils $c^3$ and $c^1$ in series, and these coils offer a high impedance to the flow of such a cross-current. In this manner a cross-flow of current between brushes of the same polarity is prevented without using auxiliary impedances of any kind, and at the same time better compensation is secured, since each portion of the armature winding is directly in series with the adjacent portion of the compensating winding, so that if any inequalities in current-flow exist in the different portions of the armature, due to differences in the air-gap or other cause, the compensating winding for each portion of the armature nevertheless carries precisely the correct amount of current for compensation.

What I claim as new and desire to secure by Letters Patent of the United States, is:

1. In a multipolar alternating-current motor, an armature having a plurality of wave-windings connected to successive commutator segments, each of said windings having a coil pitch exactly equal to the distance between poles, and a plurality of brushes of each polarity distributed symmetrically around the commutator.

2. In a multipolar alternating-current motor, an armature having a plurality of wave-windings connected to successive commutator segments, each of said windings having a coil pitch exactly equal to the distance between poles, and a plurality of brushes of each polarity distributed symmetrically around the commutator the width of each brush being insufficient to bridge adjacent commutator segments connected to the same winding.

3. In a multipolar alternating-current motor, an armature having a commutator with a number of segments divisible by the number of poles of the motor, a plurality of wave windings carried by the armature connected to successive commutator segments, and a plurality of brushes of each polarity distributed symmetrically around the commutator.

4. In a multipolar alternating-current motor, an armature having a commutator with a number of segments divisible by the number of poles of the motor, a plurality of wave windings carried by the armature connected to successive commutator segments, and a plurality of brushes of each polarity distributed symmetrically around the commutator, the width of each brush being insufficient to bridge adjacent segments connected to the same winding.

5. In a multipolar alternating-current motor, a field winding, a compensating winding, an armature having a plurality of wave windings connected to successive commutator segments, each of said windings having a coil-pitch exactly equal to the distance between the poles, a plurality of brushes of each polarity distributed around the commutator, and conductors connecting each brush individually directly in series with a portion of the compensating winding.

6. In a multipolar alternating-current motor, a field winding, a compensating winding, an armature having a plurality of wave windings connected to successive commutator segments, each of said windings having a coil-pitch exactly equal to the distance between the poles, brushes distributed around the commutator and corresponding in number to the poles of the motor, and conductors connecting each brush directly in series with the compensating winding for the adjacent pole.

7. In a multipolar alternating-current motor, a field winding, a compensating winding, an armature having a plurality of wave windings connected to successive commutator segments, each of said windings having a coil-pitch exactly equal to the distance between the poles, a plurality of brushes of each polarity distributed around the commutator, and connections between brushes of the same polarity each including a portion of the compensating winding.

8. In a multipolar alternating-current motor, a field winding, a compensating winding, an armature having a plurality of wave windings connected to successive commutator segments, each of said windings having a coil-pitch exactly equal to the distance between the poles, a plurality of brushes of each polarity distributed around the commutator, and connections from an external source of current to each brush, each connection including a portion of the compensating winding.

9. In a multipolar alternating-current motor, a field winding, a compensating winding, an armature having a plurality of wave windings connected to successive commutator segments, each of said windings having a coil-pitch exactly equal to the distance between the poles, brushes distributed around the commutator and corresponding in number to the poles of the motor, and connections from an external source of current to each brush, each connection including the compensating winding for the pole adjacent to that brush.

In witness whereof, I have hereunto set my hand this 18th day of May, 1906.

ERNST F. W. ALEXANDERSON.

Witnesses:
 BENJAMIN B. HULL,
 HELEN ORFORD.